United States Patent [19]
Salimando

[11] Patent Number: 5,970,133
[45] Date of Patent: Oct. 19, 1999

[54] CALL BRANDING SYSTEM

[75] Inventor: Steven Charles Salimando, Little Silver, N.J.

[73] Assignee: AT&T Corp, New York, N.Y.

[21] Appl. No.: 08/678,933

[22] Filed: Jul. 12, 1996

[51] Int. Cl.[6] .................................................. H04M 3/42
[52] U.S. Cl. ....................................... 379/213; 379/88.16
[58] Field of Search ........................... 379/671, 7, 93.12, 379/93.23, 111, 112, 113, 84, 87, 88, 89, 188, 189, 196, 197, 198, 199, 200, 164, 133, 134, 350, 354, 355, 201, 207, 210, 216, 243, 244, 245, 251, 257, 258, 263, 264, 265, 309, 88.16, 213

[56] References Cited

U.S. PATENT DOCUMENTS

| | | | |
|---|---|---|---|
| 4,782,508 | 11/1988 | Borchering et al. | 379/213 X |
| 4,926,471 | 5/1990 | Ikeda | 379/216 |
| 4,996,704 | 2/1991 | Brunson | 379/67 |
| 5,119,415 | 6/1992 | Aoyama | 379/207 |
| 5,473,671 | 12/1995 | Partridge, III | 379/142 |
| 5,528,672 | 6/1996 | Wert | 379/96 |
| 5,535,270 | 7/1996 | Doremus et al. | 379/266 |
| 5,539,809 | 7/1996 | Mayer et al. | 379/67 |
| 5,548,636 | 8/1996 | Bannister et al. | 379/201 |
| 5,557,664 | 9/1996 | Burns et al. | 379/114 |
| 5,559,878 | 9/1996 | Keys et al. | 379/265 |
| 5,561,703 | 10/1996 | Arledge et al. | 379/57 |
| 5,572,577 | 11/1996 | Harrila | 379/67 |
| 5,579,379 | 11/1996 | D'Amico et al. | 379/112 |
| 5,600,710 | 2/1997 | Weisser, Jr. et al. | 379/67 |
| 5,608,788 | 3/1997 | Demlow et al. | 379/111 X |
| 5,652,789 | 7/1997 | Miner et al. | 379/201 |
| 5,748,708 | 5/1998 | Chang | 379/67 |

*Primary Examiner*—Scott Weaver

[57] ABSTRACT

A communication network includes a database for storing information specific to called parties, an announcement system for announcing the information to calling parties prior to the call completion and a switch for completing the call connections between calling parties and called parties. The calling parties hear the announcements that identify the called parties and are able to avoid misdialing.

29 Claims, 7 Drawing Sheets

| SPECIAL SERVICE NO. /420 | AREA CODE /430 | EX NO. /440 | LINE NO. /450 | CALLED PARTY INFO. /460 |
|---|---|---|---|---|
| 800-222-7651 | 212 | 432 | 3481 | "LL BEAN" |
| 800-421-8639 | 301 | 333 | 9201 | "DELTA AITLINES" |
| 800-719-2124 | 703 | 437 | 4444 | "1-800-DIAL MAT" |
| 800-617-4000 | 301 | 279 | 4832 | "WEATHER LINE" |
| 900-219-8224 | 384 | 849 | 2876 | "TRAVEL HELP" |

CALL BRANDING SYSTEM

BACKGROUND OF THE INVENTION

This invention relates to announcement systems for use in communication networks. Examples of such systems are long distance carriers' welcome announcement systems, telephone card verification systems, or the like that can invoke announcements in response to particular telephone calls. More particularly, the invention relates to a branding system for branding each call with an announcement providing information about a called party, i.e., ensuring that a calling party can determine whether his call is directed to the proper called party.

Many types of announcement systems are known. Most such announcement systems provide some type of information to aid the calling party during call completions. For example, the announcement systems may announce to the calling parties the identities of long distance carriers so that the calling parties can verify their choices of the long distance carriers. In another example, the announcement systems may announce to the calling parties the identities of calling card companies, and provide instructions so that calling parties can submit their personal identification numbers for verification.

These announcement systems for use in communication networks, however, lack capabilities to provide the information about called parties, e.g., identification of the called parties. Such information benefits not only calling parties but also called parties by minimizing the number of misdialed calls that are completed. For example, the calling parties, who place long distance calls, may want to confirm whether they have dialed the correct telephone numbers prior to the call connections so that they can avoid unnecessary long distance charges incurred due to their misdialing. In another example, the called parties who own wireless phones and are subject to charges upon receipt of calls may also desire confirmations of correct telephone numbers on the part of the calling parties for the same reason. Similarly, the called parties who have toll free telephone service numbers may like to avoid misdialed calls that cause inconveniences and tying up of a limited number of telephone lines without raising any revenue while they pay for the toll free services by the number of completed calls.

It is therefore an object of this invention to provide call branding systems to announce to calling parties the information about called parties. It is more particularly an object of this invention to announce such information to calling parties prior to the completion of calls and minimize misdialing.

SUMMARY OF THE INVENTION

These and other objects of the invention are accomplished in accordance with the principles of the invention by providing a communication network that declares the identity of a called party to whom a calling party has placed a call. The communication network includes at least one switch for establishing a call connection between the calling party and the called party. The communication network also includes a database connected to the switch for establishing the identity of the called party. The announcement network additionally includes an announcing system connected to the database for providing, during a call set up, an announcement to the calling party identifying the called party in accordance with the call.

Further features of the invention, its nature and various advantages will be more apparent from the accompanying drawings and the following detailed description of the preferred embodiments.

BRIEF DESCRIPTION OF THE DRAWINGS

FIG. 5 is a simplified table of a representative portion of an illustrative database constructed in accordance with this invention.

DETAILED DESCRIPTION OF THE PREFERRED EMBODIMENTS

Figure 1:
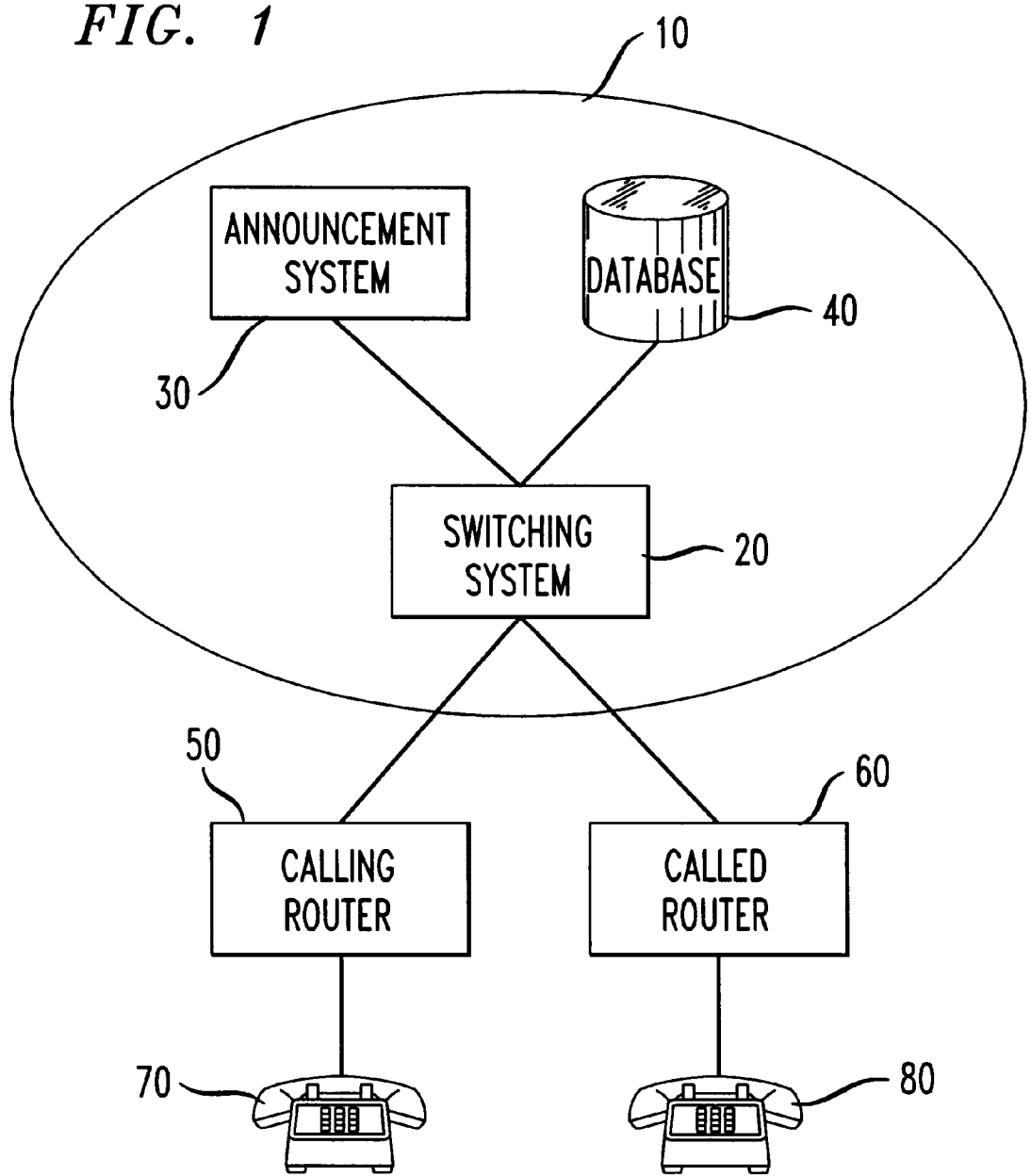
FIG. 1 is a simplified block diagram of illustrative apparatus which can be operated in accordance with this invention.

In the illustrative embodiment shown in FIG. 1, a representative communication network that provides a call branding service is shown. As used in this application, an "exchange carrier network" refers to the entity which normally provides the call branding service and includes means for implementing the call branding service. A "central office" and "router" refers to the entity which normally provides communication links between the exchange carrier and end users such as a calling party or called party.

The communication network generally includes exchange carrier network 10, calling router 50 and called router 60. Calling party 70 is connected to calling router 50 via either a conventional landline trunk or a wireless link. The calling router 50 routes the call made by the calling party 70 to proper exchange carrier network 10. Similarly, called party 80 is connected to called router 60 by either a conventional landline trunk or a wireless link. Called router 60 routes a call from exchange carrier network 10 to proper called party 80. It will be understood that these examples are only illustrative, and that many other arrangements of the communication network are possible.

Exchange carrier network 10 provides high-speed data transmission between the calling router 50 and called router 60 to carry all signaling, address, and network control information. Exchange carrier network 10 may be one provided by a cellular telephone company or a local exchange carrier (LEC) such as one of the Regional Bell Operating Companies. Alternatively, exchange carrier network 10 may be one provided by a long distance carrier such as AT&T. The exchange carrier network may also be an integrated services digital network ("ISDN") disclosed in U.S. Pat. No. 4,592,048 issued to Beckner et al. where the switching arrangement includes digital central routers 50 and 60 and digital switching system 20. Exchange carrier network 10 may include switching system 20, announcement system 30 and database 40.

Switching system 20 performs call processing and routing functions for calling party 70 and called party 80. Switching system 20 may include one or more switches depending on the routing of a call. Such switches may be local, toll or other types of switches. An example of a local switch is disclosed in U.S. Pat. No. 3,570,008 issued to Downing et al. and in "The Bell System Technical Journal," Vol. 43, No. 5, Parts 1 and 2. An example of a toll switch is disclosed in U.S. Pat. No. 3,736,381 issued to Johnson et al.

Announcement system 30, which is used in accordance with the present invention, may be a text speech machine (TSM) developed by AT&T to convert text information into voice signals. For example, the text speech machine allows an announcement such as "welcome to AT&T" from text information stored in database 40. Alternatively, announcement system 30 may be an audio system capable of playing music stored in database 40.

Database 40 maintains routing and processing information in order to enable connections between calling party 70 and called party 80 and to control the operation of switching system 20. Database 40, for example, may be a network control point (NCP) developed by AT&T that stores, among other data, conventional telephone numbers of called party 80 and corresponding identification information about called party 80. Database 40 may be partitioned into different memory areas allocated to each of the special telephone numbers. Database 40 may be capable of storing information in either a text or audio form.

Switching system 20 and database 40 serve together to process, store, update and retrieve necessary data needed to complete a call. Switching system 20 and announcement system 30 of the present invention serve together to convert and provide a part of the retrieved data to an announcement in a fraction of a second to calling party 70 before the completion of a call.

Figure 2A:
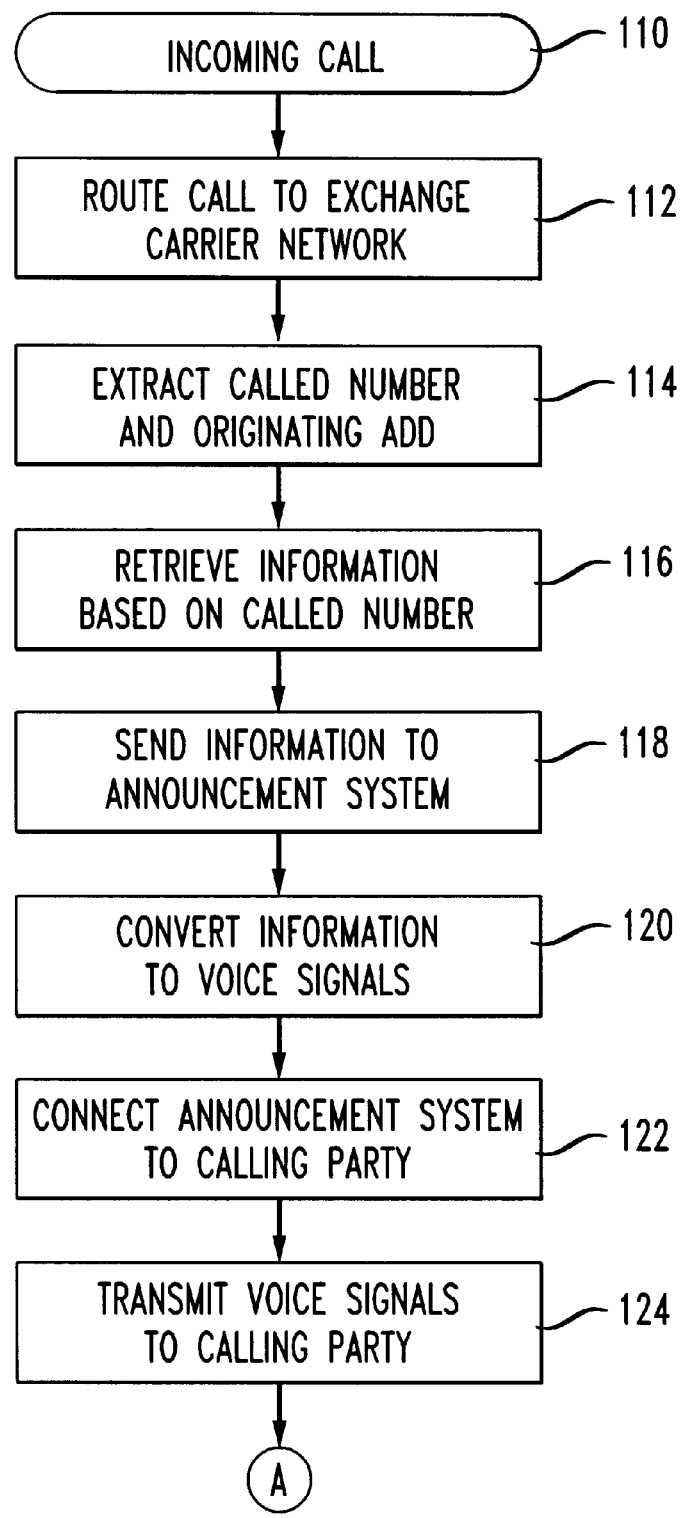
FIGS. 2a-b (collectively referred to as FIG. 2) are a flow chart of steps for carrying out an illustrative embodiment of the methods of this invention.
Figure 2B:
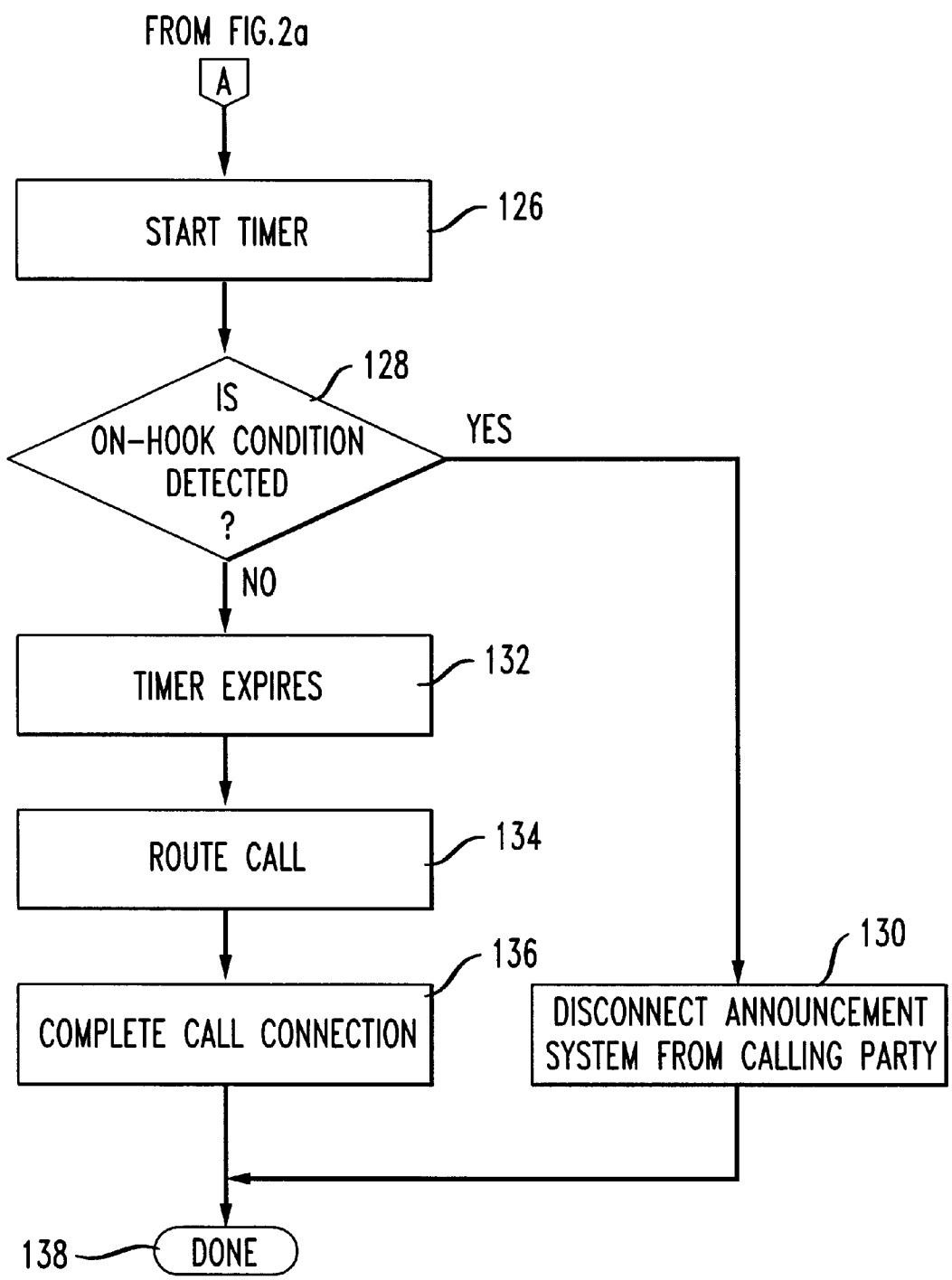

FIG. 2 shows an illustrative sequence of steps in accordance with this invention for operating the communication network of FIG. 1 as described above. To some extent these steps have already been mentioned, and so the discussion of them here can be somewhat abbreviated.

In step 110, calling router 50 detects an incoming call from calling party 70. In step 112, calling router 50 routes the call to appropriate exchange carrier network 10. In step 114, switching system 30 receives the call from calling router 50 and extracts a call originating address (calling number) and the telephone number that has been dialed (called number). Switching system 20, in step 116, accesses from database 40 information specific to called party 80 based on the extracted called number in step 114. Such information typically includes call processing and call routing information necessary to complete the call between calling party 70 and called party 80 and to control operations of switching system 20.

In step 118, a portion of the retrieved information specific to called party 80 is transferred to announcement system 30. In step 120, the transferred information is converted from text to voice signals. Alternatively, database 40 includes an audio storage device and the retrieved information may already be in an audio format to be transmitted to calling party 70.

In step 122, switching system 20 connects announcement system 30 via calling router 50 to calling party 70 based on the call originating address extracted from the call.

In step 124, announcement system 30 transmits the synthesized voice signals specific to called party 80 to calling party 70. The announcement typically identifies called party 80 and enhances the communication service by providing called party 80 ability to reduce the number of misdialed calls and preserving limited communication resources allocated to called party 80.

In step 126, switching system 20 starts a timer that has a predetermined period of waiting time. The waiting time provides calling party 70 an opportunity to respond to the announcement by either continuing to hold for a connection or disconnecting the call. For example, when the announcement identifies called party 80, calling party 70 determines whether the identified called party 80 is whom calling party 70 intends to call. Thereafter, calling party 70 either continues to hold or hangs up.

In step 128, switch system 20 determines whether an on-hook condition is detected. If the on-hook condition is detected, switching system 20 concludes that calling party 70 hung up and disconnects announcement unit 30 from calling party 70 at step 130 and subsequently terminates the call.

If not, switching system 20 waits until the timer expires in step 132. Switching system 20, in step 134, routes the call to called router 60 which in response routes the call to the called party 80. In step 136, switching system 20 pursues to complete the call by establishing a connection between calling party 70 and called party 80.

The process ends in step 138.

Figure 3:
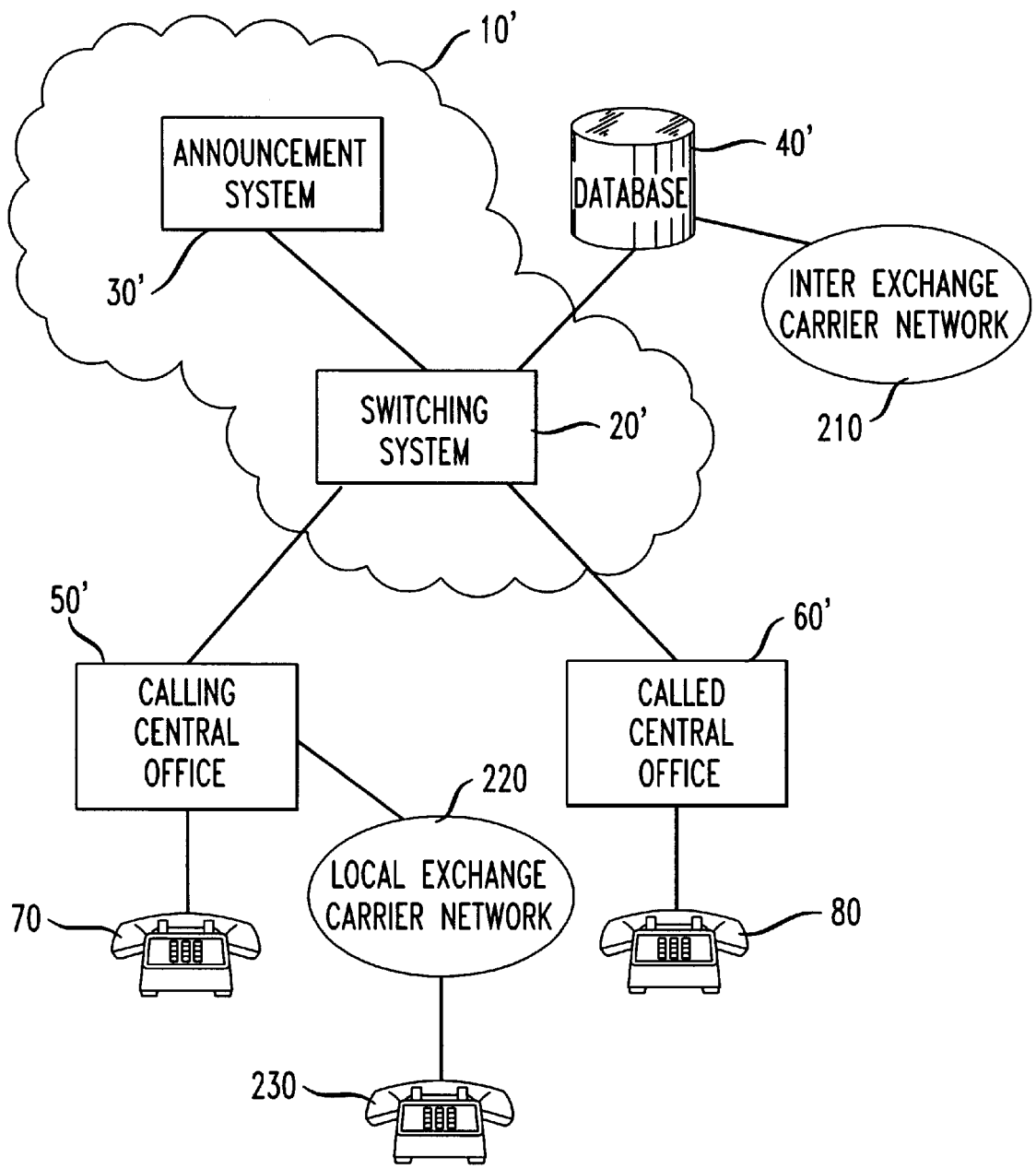
FIG. 3 is a simplified block diagram of an alternative illustrative apparatus which can be operated in accordance with this invention.

FIG. 3 shows an alternative form of the communication network shown in FIG. 1. FIG. 3 is similar to FIG. 1 except that FIG. 3 shows elements 10', 20', 30', 40', 50' and 60' which permit special services such as 800/888/900 services.

In FIG. 3, exchange carrier network 10' used for the call branding service is an inter exchange carrier network since local exchange carrier network 220 currently does not have a capability to handle the special services. Thus, FIG. 3 expressly shows the type of overall communication network in which the call branding service can be provided in conjunction with the special services.

The 800/888/900 call services, for example, require additional functions from database 40' to convert 800/888/900 called numbers to conventional call numbers so that switching system 20' may obtain appropriate information for providing the call branding services as well as completing call connections. Database 40' with such additional functions may be centralized or shared by other inter exchange carrier networks, e.g., inter exchange network 210 as shown.

Thus, when the called number is a special service number, e.g., 800/888/900 number, a distinctive short announcement about called party 80 is made prior to completion of the call. For example, if calling party 70 dials LL Bean's 800 number, calling party 70 would hear "LL Bean" or "welcome to LL Bean" prior to completion of the call.

Figure 4A:
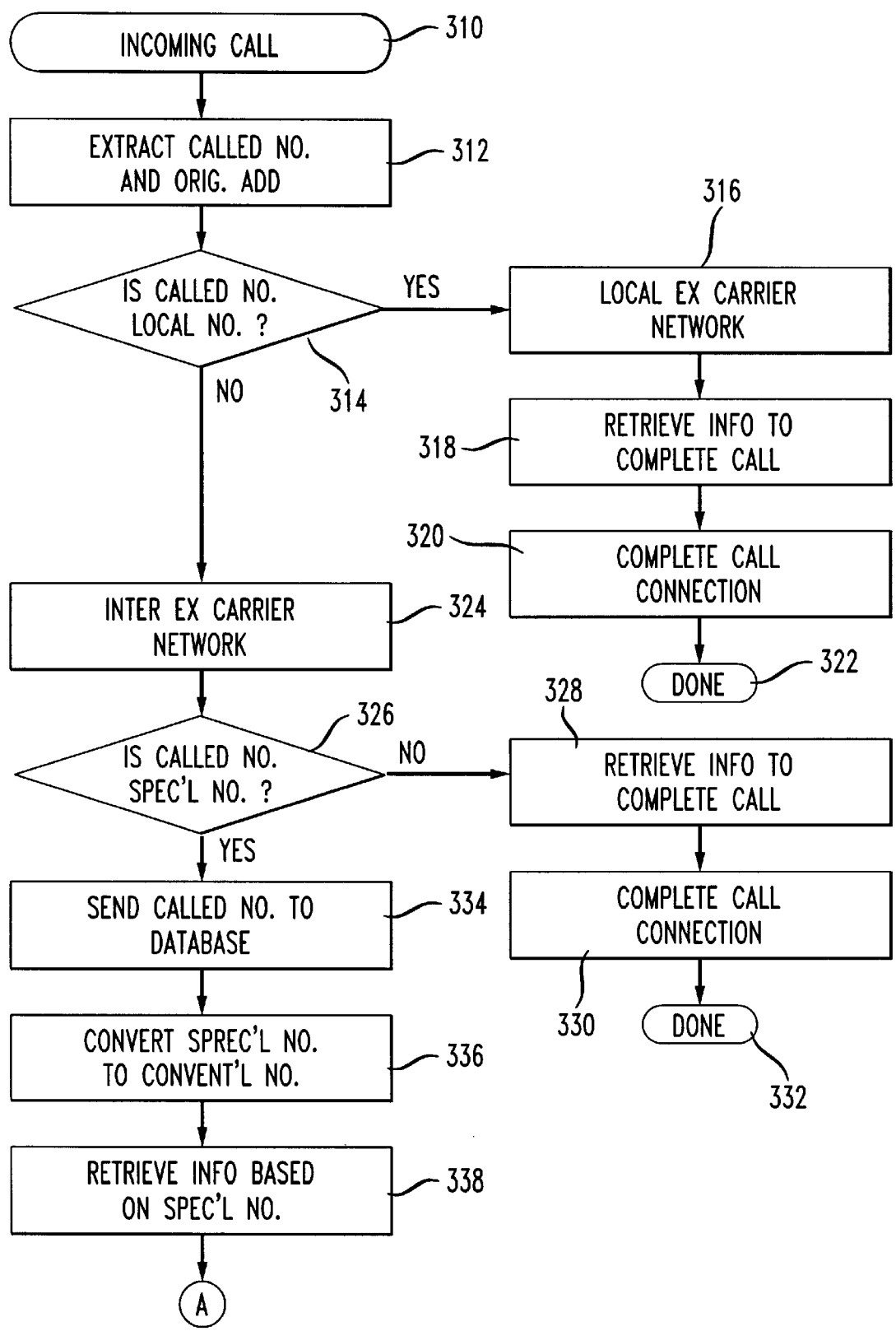
FIGS. 4a-b (collectively referred to as FIG. 4) are a flow chart of steps for carrying out another illustrative embodiment of the methods of this invention.
Figure 4B:
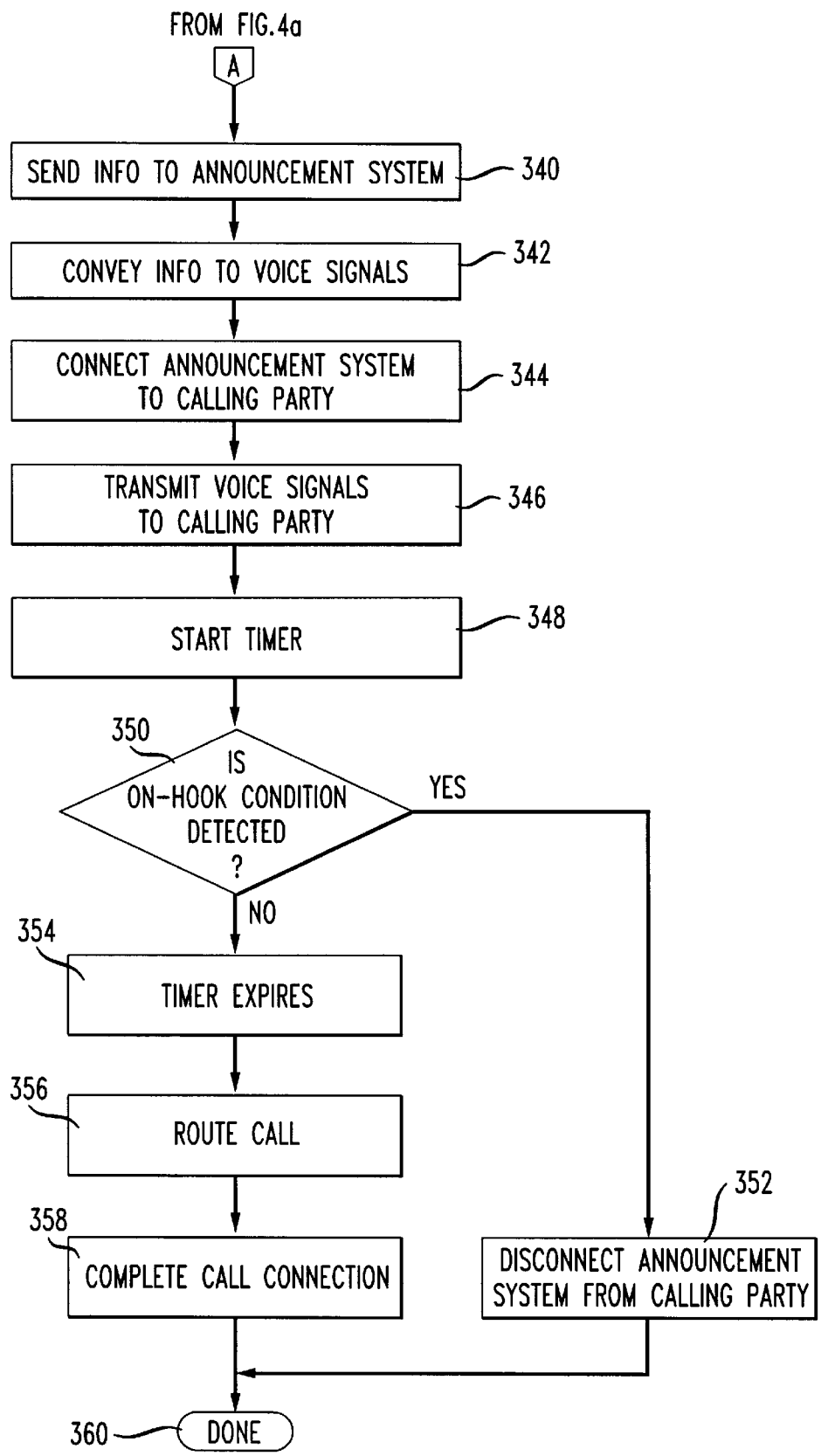

FIGS. 4a–b shows adaptation of the method of FIG. 2 to a system of the type shown in FIG. 3. Many of the steps in FIG. 2 are the same as or similar to steps in FIG. 2. Thus, the discussion of many of the steps in FIG. 2 can be somewhat abbreviated because more extensive discussion has already been provided for corresponding steps in FIG. 2.

In step 310 (similar to step 110 in FIG. 2), calling central office 50' detects a call from calling party 70. In step 312 (similar to step 114 in FIG. 2), calling central office 50' extracts a called telephone number and the originating address of the call. In test 314, central office 50' determines whether the retrieved telephone number is a local number. If the retrieved telephone number is a local number, central calling office 50' routes the call to local exchange carrier network 220 at step 316. In step 318, local exchange carrier network 220 retrieves from its own database the necessary information to complete the call. In step 320, based on the retrieved information, local exchange carrier network 200 completes the call between calling party 70 and called party 80. This process ends in step 322.

If the retrieved telephone number is not a local number, calling central office 50' in step 324, routes the call to switching system 20' of inter exchange carrier network 10'. In step 326, switching system 20' determines whether the called number is a special number. If switching system 20' concludes that it is a regular long distance call, it retrieves, in step 328, the necessary information to complete the long distance call. In step 330, switching system 20' completes the long distance call based on the retrieved information. This process ends in step 332.

If switching system 20' determines that the called number is a special number, switching system 20', in step 334, sends the special number to database 40'. In step 336, database 40' converts the special number to a conventional number that can be used to complete the call. At step 338 (similar to step 116 in FIG. 2), database 40' retrieves the processing and routing information specific to the special number.

In step 340 (similar to step 118 in FIG. 2), switching system 20' sends a portion of the retrieved information to announcement system 30'. At step 342 (similar to step 120 in FIG. 2), announcement system 30' converts received information in text to voice signals. In step 344 (similar to step 122 in FIG. 2), switching system 20' connects announcement system 30' to calling party 70 based on the originating address of calling party 70 extracted from the call. In step 346 (similar to step 124 in FIG. 2), announcement system 30' transmits voice signals to calling party 70, and an announcement is made to calling party 70. The announcement typically identifies called party 80 who has the 800/888/900 call numbers.

In step 348 (similar to step 126 in FIG. 2), switching system 20' starts a timer and waits for a response from calling party 70 to the announcement. The period of waiting time is predetermined. In step 350 (similar to test 128 in FIG. 2), switching system 20' determines whether an on-hook condition, i.e., calling party 70 hangs up the phone, is detected. If the on-hook condition is detected, switching system 20' concludes that calling party 70 dialed a wrong number (similar to step 130 in FIG. 2), and disconnects announcement system 30' from calling party 70 in step 352. This process ends in step 360.

If the on-hook condition is not detected, switching system 20' waits until the timer expires in step 354 (similar to step 132 in FIG. 2). In step 356 (similar to step 134 in FIG. 2), switching system 20' routes the call to called central office 60' which in response routes the call to called party 80. In step 358 (similar to step 136 in FIG. 2), switching system 20' pursues to complete the call by establishing the connection between calling party 70 and called party 80. The process ends in step 360 (similar to step 138 in FIG. 2).

FIG. 5 shows an illustrative portion of a database 40' in the form of a table in accordance with the communication network of FIG. 3 as described above. The table 410 may include several columns, 420, 430, 440, 450 and 460 of data for use in the special service system. The special service number column 420 and conventional number columns 420, 440 and 450 are used for converting a special number to a conventional number in order to complete the connection for a special service call. Columns 430, 440 and 450, respectively, include area codes, exchange numbers and line numbers and form conventional numbers.

Table 410 also includes the information relating to each special service number in column 460. This text information may be sent to announcement system 30', converted to voice signals, and eventually announced to calling parties 70. The information contained in column 460 is specific to each of called parties 80. Such information may either identify called parties 80 or describe the services provided by called parties 80.

The information, for example, identifies called party 80 as "LL Bean," "Delta Airlines" or "1-800-DIALMAT." In another example, the information identifies the types of services provided by called party 80 such as "weather line" for providing weather information or "travel help" for providing travel tips and assistance. It will be understood that these examples are only illustrative, and that many other types of information are possible.

It will be understood that the foregoing is only illustrative of the principles of the invention and that various modifications can be made by those skilled in the art without departing from the scope and spirit of the invention.

The invention claimed is:

1. A communication network that declares an identity of a called party to whom a calling party has placed a call, said communication network comprising:

at least one switching means for setting up and thereafter completing said call placed by said calling party to said called party;

storage means coupled to said switching means for storing routing information for said called party;

announcing means coupled to said storage means for converting a portion of said stored routing information into voice signals and for providing, during the call set-up, an announcement to said calling party identifying said called party; and a timer, connected to said announcing system and said switching means being programmed to complete said call only after a passage of a period of time sufficient for said calling party to indicate a termination of said call after said announcement of said identity of said called party.

2. The communication network defined in claim 1 wherein said storage means extracts from said call a special number dialed by said calling party and translates said special number to a routing message.

3. The communication network defined in claim 2 wherein said at least one switching means completes said call based on said routing message.

4. The communication network defined in claim 2 wherein said special number dialed by said calling party is a toll free telephone service number.

5. The communication network defined in claim 4 wherein said routing message is a telephone number.

6. The communication network defined in claim 1 wherein said announcing means is a text to speech machine for converting text of said portion of said routing information to voice signals.

7. The communication network defined in claim 1 wherein said announcing means is an audio machine for playing an audio form of said portion of said routing information.

8. The communication network defined in claim 7 wherein said audio form includes music.

9. A communication network that announces information about a called party to whom a calling party has placed a call, said communication network comprising:

a database for storing information specific to said called party;

a switch connected to said database for receiving said call, for identifying said called party from said call, for accessing from said database said information specific to said called party for establishing a call connection based on said information;

an announcing system connected to said database for synthesizing voice signals based on said information, and for providing said voice signals to said calling party before establishing said call connection, a timer, connected to said announcing system and said switch, said switch delaying a completion of said call for a period after a completion of an instance of providing of said voice signals to said calling party, said period being responsive to said timer; and a controller connected to said switch programmed to disconnect said call after an end of said period responsive to a detection of an on-hook condition generated by said calling party;

said period being sufficient to allow said caller to generate said on-hook condition before an end of said period.

10. The communication network defined in claim 9 wherein said voice signals identify said called party.

11. The communication network defined in claim 10 wherein the voice signals substantially uniquely identify said called party.

12. The communication network defined in claim 9 further comprising a first router for routing said call from said calling party to said switch.

13. The communication network defined in claim 12 further comprising a second router for routing said call from said switch to said called party.

14. The communication network defined in claim 9 wherein said information includes call processing and call routing information.

15. The communication network defined in claim 14 wherein said switch establishes call connections based on said call routing information.

16. The communication network defined in claim 14 wherein said announcing system synthesizes said voice signals based on said call processing information.

17. The communication network defined in claim 16 wherein said call processing information includes an identification of said called party.

18. A communication network that announces information about a called party to whom a calling party has placed a special service call, said communication network comprising:

a database for retrieving a telephone number and name information of said called party from said special service call;

a switch connected to said database for receiving said special service call, for completing said special service call to said called party based on said telephone number;

a converter connected to said database for synthesizing voice signals based on said name information of said called party, and for providing said voice signals, to said calling party during a call set-up; and a delay timer connected to said switch, said switch being programmed to delay a completing of said call for a period determined by said delay timer following a providing of said voice signals to said calling party and said switch being further programmed to disconnect said converter from said calling party in response to a detection of an on-hook condition generated by said calling party said call set-up occurring prior to a completion of said special service call.

19. The communication network defined in claim 18 further comprising:

a first router for routing said special service call from said calling party to said switch; and a second router for routing said special service call to said called party based on said telephone number.

20. The communication network defined in claim 19 wherein said first and second routers are local exchange carrier routers.

21. The communication network defined in claim 19 wherein said switch is an inter exchange carrier switch that handles said special service call.

22. A method of completing a call, comprising the steps of:

initiating a call via a switched network;

establishing from said call, a telephone number of a called party; retrieving, from a database, routing information for said called party;

converting a portion of said retrieved routing information to a voice message identifying said called party;

announcing to said calling party said voice message identifying said called party;

detecting a choice by said calling party to terminate said call prior to completing said call; and completing said call when a result of said detecting indicates said calling party does not wish to terminate said call.

23. A device for preventing undesired calls through a long-distance switched network, comprising:

a database connected to be interrogated by said network when a call from a calling station is initiated through said network;

said database yielding an identity of a called party corresponding to said call upon an interrogation of said database; and a messaging system connected to said network and said database;

said messaging system being selectively connectable to said calling station;

said messaging system being programmed to transmit a message to said calling station, said message containing said identity;

said messaging system being further programmed to detect an event generated at said calling station indicating a decision not to complete said call after a transmission of said message; and said messaging system being further programmed to disconnect said messaging system from calling station upon a detection of said event.

24. A network capable of preventing undesired long-distance calls, comprising:

a switching system with an announcement system and a database;

said switching system being connected with a calling router with a calling station;

said switching system being connected with a called router with a called station;

said database containing an identity of said called station;

said switching system transmitting a message containing said identity to said calling station upon an initiation by said calling station of a call to said called station; and said switching system delaying a completion of said call after said message has been transmitted, said switching system thereafter interrupting a process of completing said call in response to an indication at said calling station that said call is desired not be completed, whereby utilization of long-distance resources of said switching system is avoided by a termination of said call to said called station.

25. A network as in claim 24, wherein said switching system is one of a part of an inter-exchange carrier providing communications between local access and transport carriers and at least a part of a public switched telephone network providing toll switching services.

26. A network capable of preventing undesired calls, comprising:

a switching system with an announcement system and a database;

said switching system connecting a calling router with a calling station and a called router with a called station;

said database containing an identity of said called station;

said switching system being programmed to generate billing data used in response to a completion of a call from said calling station to said called station and corresponding with resources of said switching system used to complete said call;

said switching system being programmed to transmit a message containing said identity to said calling station upon an initiation by said calling station of said call to said called station;

said switching system being programmed to interrupt a process of completing said call, after said message has been transmitted, in response to an indication at said calling station that said call is to be terminated, such that utilization of said resources is avoided by a termination of said call to said called station, whereby billing data generated by said switching system reflects that non-utilization.

27. A method for declaring the identity of a called party to whom a call is placed by a calling party, comprising the steps of:

storing routing information for said called party in a database prior to receiving said call placed by said calling party;

detecting an incoming call for said called party from said calling party;

retrieving said routing information from said database;

transferring a portion of said routing information to an announcement system;

converting said transferred portion of said routing information into synthesized voice signals; and transmitting said synthesized voice signals to said calling party.

28. The method of claim 27, further comprising the steps of: waiting a period of time before completing said call; and completing said call only when there is no indication that said calling party has terminated the call.

29. The method of claim 27, wherein said transferred portion of said routing information is in text format and said step of converting further comprises the step of performing a text to voice conversion.

* * * * *